(12) United States Patent
Santilli

(10) Patent No.: US 6,183,604 B1
(45) Date of Patent: Feb. 6, 2001

(54) DURABLE AND EFFICIENT EQUIPMENT FOR THE PRODUCTION OF A COMBUSTIBLE AND NON-POLLUTANT GAS FROM UNDERWATER ARCS AND METHOD THEREFOR

(75) Inventor: Ruggero Maria Santilli, Palm Harbor, FL (US)

(73) Assignee: Hadronic Press, Inc., Palm Harbor, FL (US)

( * ) Notice: Under 35 U.S.C. 154(b), the term of this patent shall be extended for 0 days.

(21) Appl. No.: 09/372,277

(22) Filed: Aug. 11, 1999

(51) Int. Cl.$^7$ .................................................. B01J 19/08
(52) U.S. Cl. ................ 204/172; 422/186.28; 422/186.26
(58) Field of Search .................................... 204/164, 172; 422/186.23, 186.26

(56) References Cited

U.S. PATENT DOCUMENTS

| | | | |
|---|---|---|---|
| 603,058 | * 4/1898 | Eldridge et al. ...................... 204/278 |
| 4,089,770 | * 5/1978 | Lemke ................................. 204/247 |
| 5,159,900 | 11/1992 | Dammann . | |
| 5,417,817 | 5/1995 | Dammann et al. . | |
| 5,435,274 | * 7/1995 | Richardson, Jr. .......................... 123/3 |
| 5,692,459 | * 12/1997 | Richardson, Jr. .......................... 123/3 |
| 5,792,325 | * 8/1998 | Richardson, Jr. ...................... 204/164 |
| 5,826,548 | * 10/1998 | Richardson, Jr. .......................... 123/3 |

* cited by examiner

Primary Examiner—Kathryn Gorgos
Assistant Examiner—Thao Tran
(74) Attorney, Agent, or Firm—Dennis G. LaPointe; Louise A. Foutch; Mason & Assoc., P.A.

(57) ABSTRACT

A system for producing a clean burning combustible gas comprising an electrically conductive first electrode and an electrically conductive second electrode. A motor coupled to the first electrode is adapted to move the first electrode with respect to the second electrode to continuously move the arc away from the plasma created by the arc. A water tight container for the electrodes is provided with a quantity of water within the tank sufficient to submerge the electrodes.

11 Claims, 4 Drawing Sheets

DURABLE AND EFFICIENT EQUIPMENT FOR THE PRODUCTION OF A COMBUSTIBLE AND NON-POLLUTANT GAS FROM UNDERWATER ARCS AND METHOD THEREFOR

BACKGROUND OF THE INVENTION

1. Field of the Invention

The present invention relates to durable and efficient equipment for the production of a combustible and non-pollutant gas from underwater arcs and method therefor and more particularly pertains to producing a combustible gas from the underwater arcing of electrodes moving with respect to each other.

2. Description of the Prior Art

The combustible nature of the gas bubbling to the surface from an underwater welding arc between carbon electrodes was discovered and patented in the last century. Various improved equipment for the production of said combustible gas have been patented during this century. Nevertheless, the technology has not yet reached sufficient maturity for regular industrial and consumer production and sales because of numerous insufficiencies, including excessively short duration of the carbon electrodes which requires prohibitive replacement and service, as well as low efficiency and high content of carbon dioxide responsible for the green house effect. As a result of numerous experimentations, this invention deals with a new equipment for the production of a combustible gas from underwater arcs between carbon electrodes which resolves said insufficiencies, and achieves the first known maturity for industrial production and sales.

The technology of underwater electric welding via the use of an arc between carbon electrodes to repair ships, was established in the last century. It was then discovered that the gas bubbling to the surface from underwater arcs is combustible. In fact, one of the first U.S. patent on the production of a combustible gas via an underwater electric arc between carbon electrodes dates back to 1898 (U.S. Pat. No. 603,058 by H. Eldridge).

Subsequently, various patents were obtained in this century on improved equipment for the production of said combustible gas, among which I quote U.S. Pat. No. 5,159,900 (W. A. Dammann and D. Wallman, 1992); U.S. Pat. No. 5,435,274 (W. H. Richardson, Jr., 1995); U.S. Pat. No. 5,417,817 (W. A. Dammann and D. Wallman, 1995); U.S. Pat. No. 5,692,459 (W. H. Richardson, Jr., 1997); U.S. Pat. No. 5,792,325 (W. H. Richardson, Jr., 1998); and U.S. Pat. No. 5,826,548 (W. H. Richardson, Jr., 1998).

The main process in these inventions is essentially the following. The arc is generally produced by a DC power unit, such as a welder, operating at low voltage (25–35 V) and high current (300 A to 3,000 A) depending on available Kwh. The high value of the current brings to incandescence the tip of the carbon electrode in the cathode, with consequential disintegration of the carbon crystal, and release of highly ionized carbon atoms to the arc. Jointly, the arc separates the water into highly ionized atoms of Hydrogen and Oxygen. This causes in the immediate surrounding of the arc a high temperature plasma of about 7,000 F, which is composed by highly ionized H, O and C atoms. A number of chemical reactions then occur within or near said plasma, such as: the formation of the $H_2$ and $O_2$ molecule; the burning of H and O into $H_2O$; the burning of C and O into CO; the burning of CO and O into $CO_2$; and other reactions. Since all these reactions are highly exothermic, they result in the typical, very intense glow of the arc within water, which is bigger than that of the same arc in air. The resulting gases cool down in the water surrounding the discharge, and bubble to the surface, where they are collected with various means. According to numerous measurements conducted at various independent laboratories, the combustible gas produced with the above process essentially consists of 45%–48% $H_2$, 36%–38% CO, 8%–10% $CO_2$, and 1%–2% $O_2$, the remaining gas consisting of parts per million of more complex molecules composed by H, O and C.

This process produces an excellent combustible gas because the combustion exhausts meet all current EPA requirement without any catalytic muffler at all, and without the highly harmful cancerogenic pollutants which are contained in the combustion exhausts of gasoline, diesel, natural gas and other fuels of current use.

Despite the indicated excellent combustion characteristics, and despite research and development conducted by inventors for decades, the technology of the combustible gas produced by an underwater arc between carbon electrodes has not reached industrial maturity until now, and no equipment producing said combustible gas for actual practical usages is currently sold to the public in the U.S.A. or abroad, the only equipment currently available for sale being limited to research and testing. The sole equipment currently sold for public use produce different gases, such as the Brown gas which is not suitable for use in internal combustion engines because it implodes, rather than explodes, during combustion.

The main reason for lack of industrial and consumer maturity is the excessively short duration of the carbon electrodes, which requires prohibitive replacement and services. According to extensive, independently supervised, and certified measurements, the electrodes are typically composed of solid carbon rods of about ⅜ inch in diameter and about 1 foot length. Under 14 Kwh power input, said electrodes consume at the rate of about one and one quarter inch length per minute, requiring the halting of the operation, and replacement of the electrodes every ten minutes.

The same tests have shown that, for 100 Kwh power input, said electrodes are generally constituted by solid carbon rod of about 1 inch diameter and of the approximate length of one foot, and are consumed under a continuous underwater arc at the rate of about 3 inch length per minute, thus requiring servicing after 3 to 4 minutes of operation. In either case of 14 Kwh or 100 Kwh, current equipment requires servicing after only a few minutes of usage, which is unacceptable on industrial and consumer grounds for evident reasons, including increased risks of accidents for very frequent manual operations in a high current equipment.

An additional insufficiency of existing equipment is the low efficiency in the production of said combustible gas, which efficiency is hereinafter referred to the ratio between the volume of combustible gas produced in cubic feet per hour (cfh) and the real electric power at the panel used per hour (Kwh). For instance extensive measurements have established that pre-existing equipment have the efficiency of 2–3 cfh/Kwh. Yet another insufficiency of existing equipment is the high content in said combustible gas of carbon dioxide, which is the gas responsible for the green house effect. In fact, prior to combustion said gas has a CO2 content of 8%–10% with a corresponding content after combustion of about 15% CO2, thus causing evident environmental problems.

SUMMARY OF THE INVENTION

In view of the foregoing disadvantages inherent in the known types of traditional equipment for the production of combustible and non-pollutant gases now present in the prior art, the present invention provides improved durable and efficient equipment for the production of a combustible and non-pollutant gas from underwater arcs and method therefor.

As such, the general purpose of the present invention, which will be described subsequently in greater detail, is to provide new and improved durable and efficient equipment for the production of a combustible and non-pollutant gas from underwater arcs and method therefor and method which has all the advantages of the prior art and none of the disadvantages.

To attain this, the present invention essentially comprises a new and improved system for producing a clean burning combustible gas from an electric arc generating plasma under water. First provided is an electrically conductive anode fabricated of tungsten. The anode is solid in a generally cylindrical configuration with a diameter of about one inch and a length of about three inches. Next provided is a generally Z-shaped crank of a electrically conductive material. The crank has a linear output end supporting the anode. The crank also has a linear input end essentially parallel with the output end. A transverse connecting portion is located between the input and output ends. An electrically conductive cathode is next provided. The cathode is fabricated of carbon. The carbon is in a hollow tubular configuration with an axis. The cathode has a supported end and a free end. The cathode has a length of about 12 inches and an internal diameter of about 11½ inches and an external diameter of about 12½ inches. A motor is next provided. The motor has a rotatable drive shaft. The drive shaft has a fixed axis of rotation. The motor is coupled to the input end of the crank and is adapted to rotate the crank to move the output end and anode in a circular path of travel. The circular path of travel has a diameter of about twelve inches with the anode located adjacent to the free end of the cathode. In this manner the anode and the arc are continuously moved around the cathode and away from the plasma created by the arc. Next provided is an axially shifted support. The support is in a circular configuration to receive the supported end of the cathode and to move the cathode axially toward the anode as the carbon of the cathode is consumed during operation and use. Next provided is a water tight container for the anode, cathode, crank and support. A quantity of water is provided within the tank sufficient to submerge the anode and the cathode. Next provided is an entrance port in the container. The entrance port functions to feed water and a carbon enriched fluid into the container to supplement the carbon and water lost from the container during operation and use. Next provided is a source of potential. The source of potential couples the anode and the cathode. In this manner an electrical arc is created between the anode and the cathode with a surrounding plasma for the production of gas within the water. The gas will then bubble upwardly to above the water. Last provided is an exit port for exhausting gas resulting from the application of current from the source of potential to the anode and the cathode while the anode is rotating and the cathode is shifting axially.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide new and improved durable and efficient equipment for the commercial production of a combustible and non-pollutant gas from underwater arcs and method therefor which has all of the advantages of the prior art equipment for the production of combustible and non-pollutant gasses and none of the disadvantages.

It is another object of the present invention to provide new and improved durable and efficient equipment for the production of a combustible and non-pollutant gas from underwater arcs and method therefor which may be easily and efficiently manufactured and marketed on a commercial basis.

Lastly, it is an object of the present invention to provide a new and improved system for producing a clean burning combustible gas comprising an electrically conductive first electrode, an electrically conductive second electrode, a motor coupled to the first electrode and adapted to move the first electrode with respect to the second electrode to continuously move the arc away from the plasma created by the arc, and a water tight container for the electrodes with a quantity of water within the tank sufficient to submerge the electrodes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
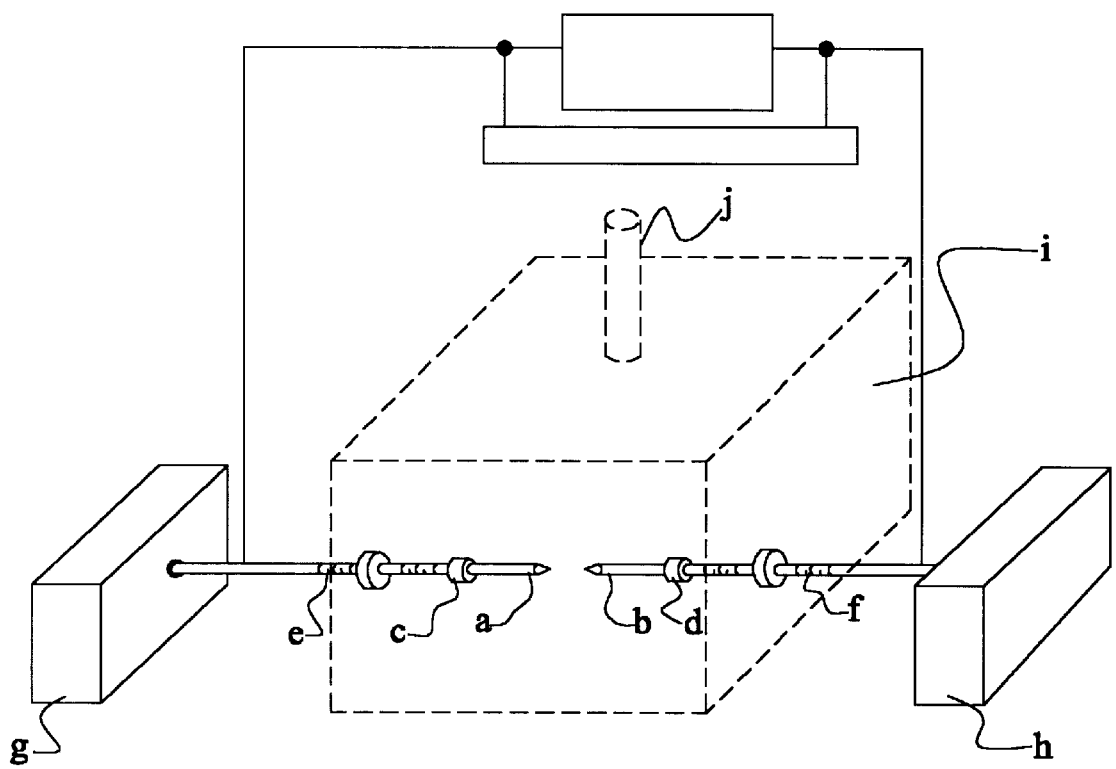
FIGS. 1 and 2 are illustrations of prior art equipment for the fabrication of a pollutant-free combustible gas produced by an electric arc under water constructed with prior art technique.

With reference to FIG. 1, a typical embodiment of the electrodes of current use for the production of a combustible gas from underwater arcs is that in which one or more pairs of solid carbon rods are immersed within the selected liquid head-on along their cylindrical symmetry axis. The activation of the arc first requires the physical contact of the tips of the two rods, with consequential large surge of electricity due to shorting, followed by a retraction of the electrodes up to the arc gap, which is typically of the order of 1/16 inch depending on power input. The components of such embodiment include:

a, b: carbon electrodes
c, d: holder of a & b
e, f: screws for advancement of a & b
g, h: mechanism for the advancement of a & b
i: reaction chamber
j: exit of combustible gas from chamber Numerous alternatives to the above typical embodiment have been invented. For instance, in the U.S. Pat. No. 603,058 (H. Eldridge, 1898) one can see a variety of configurations of the electrodes, including rod shaped anodes and disk-shaped cathodes. As a further example also with reference to FIG. 1, the embodiment of U.S. Pat. No. 5,159,900 (W. A. Dammann and D. Wallman, 1992) and U.S. Pat. No. 5,417,817 (W. A. Dammann and D. Wallman, 1995), essentially consists of the preceding geometric configuration of the electrodes, complemented by a mechanisms for the inversion of polarity between the electrodes, in view of the fact that the cathode experiences the highest consumption under a DC arc, while the anode experiences a comparatively much reduced consumption. Even though innovative, this second embodiment also remains manifestly insufficient to achieve the duration of the electrodes needed for industrial maturity, while adding other insufficiencies, such as the interruption of the arc at each time the polarities are inverted, with consequential loss of time and efficiency due to the indicated electrical surges each time the arc is initiated.

Figure 2:
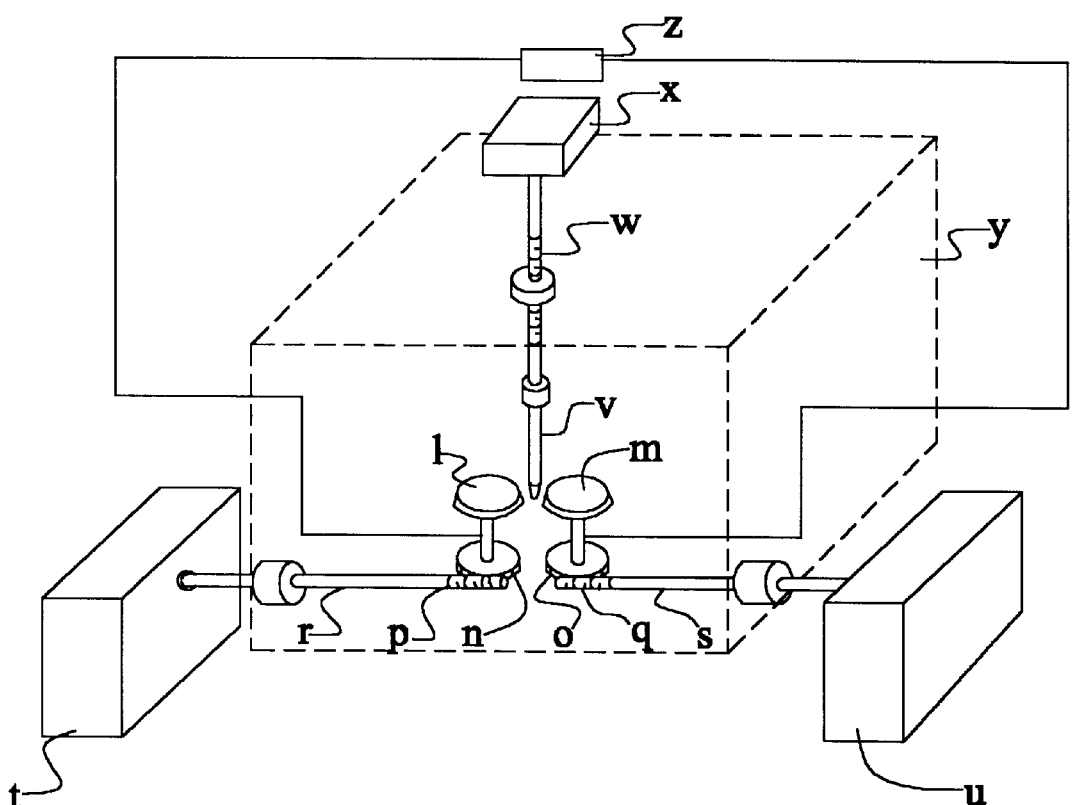

As an additional example, and with reference to FIG. 2, the mechanism of the U.S. Pat. No. 5,792,325 (W. H. Richardson, Jr., 1998), has a different preferred embodiment consisting of one or more pairs of electrodes in the shape of carbon disks rotating at a distance along their peripheral edges, in between which an electrically neutral carbon rod is inserted. Said rod causes the shorting necessary to activate the arc, and then the maintenance of the arc itself. This latter mechanism also does not resolve the main problem herein considered. In fact, the neutral carbon rod is consumed at essentially the same rate as that of the preceding embodiments. In addition, the mechanism has the disadvantage of breaking down the single arc between two cylindrical electrodes into two separate arcs, one per each the two couplings of the conducting disk and the neutral rod, with consequential reduction of efficiency due to the drop of voltage and other factors. Numerous means can be envisaged to improve the life of carbon electrodes, such as mechanisms based on barrel-type rapid replacements of the carbon rods. These mechanisms are not preferred here because the arc has to be reactivated every time a rod is replaced, thus requiring the re-establishing of the arc with physical contact, and consequential shortcomings indicated earlier. The components of such embodiment include:

l, m: carbon disk electrodes
n, O: gear rotating l & m
p, q: side gear for rotating n & o
r, s: shaft of gears p & q
t, u: mechanism for rotating shafts r & s
v: electrodes neutral vertical rod
w: advancement of v
x: mechanism for advancement of v
y: reactor chamber
z: electrical power mechanism This inventor believes that the primary origin of the insufficiency herein considered rests with the carbon rods themselves, which are indeed effective for underwater welding, but are not adequate for the different scope of producing a combustible gas from underwater arcs.

Figure 3:
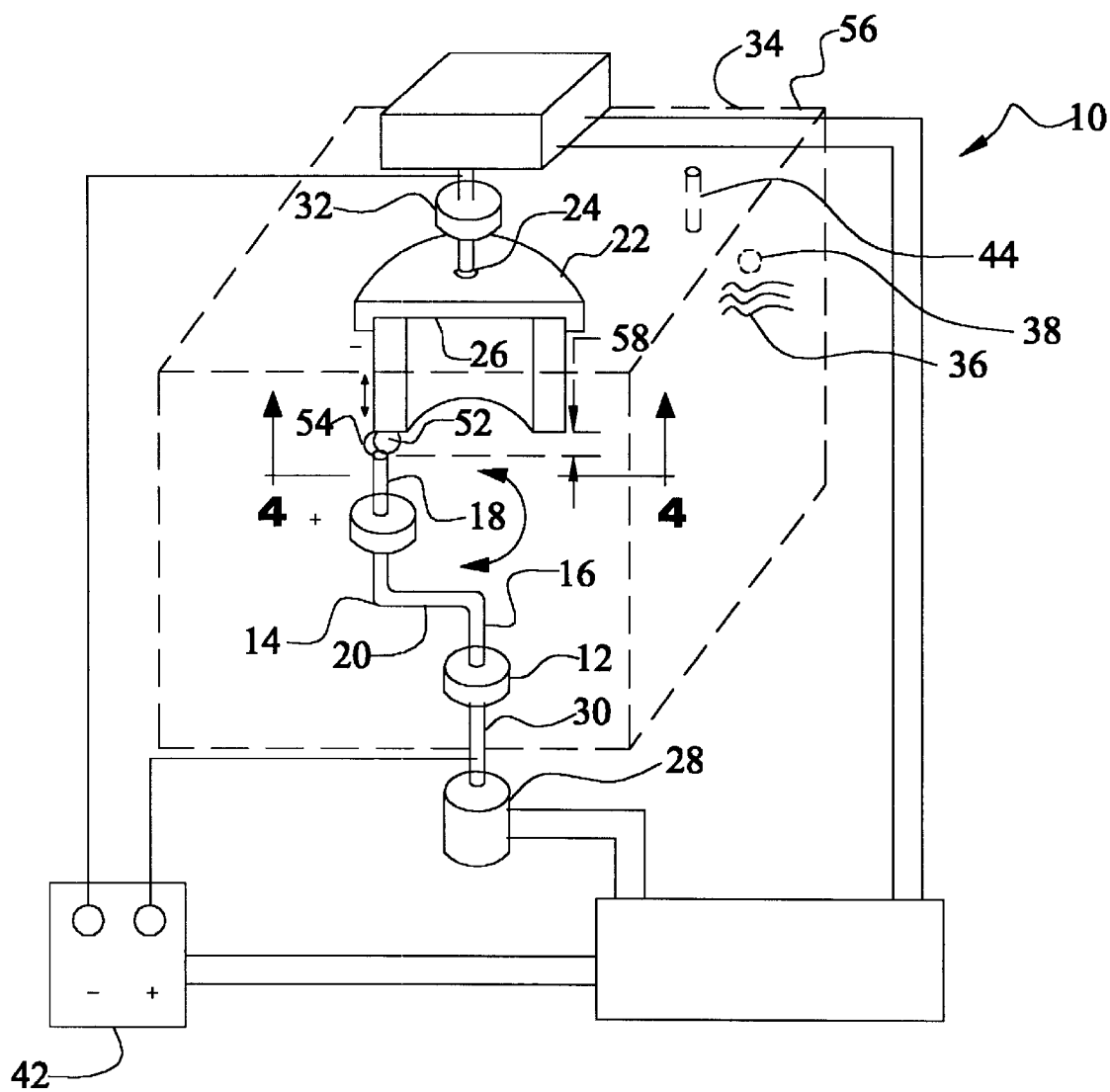
FIG. 3 is a schematic diagram depicting the principles of the present invention.

With reference to FIG. 3, this invention specifically deals with an equipment that solves the insufficiency herein considered, by achieving the duration desired by the manufacturer, while sustaining a continuous arc without interruptions for the entire desired duration. For the case of large industrial production of said combustible gas with electrical energy input of the order of 100 Kwh, a representative equipment of this invention essentially consists of:

1) One or more arcs produced by a DC current as typically available in commercially sold power units;

2) One or more anodes made of solid rods of about 1 inch in diameter and about 2 inches in length and composed by a high temperature conductor, such as Tungsten or ceramic. Extensive and diversified experimentations have established that the consumption of said anode composed by ordinary Tungsten is minimal, and definitely of the order of several weeks of operation.

3) One or more carbon-based cathodes in the configuration of a large hollow rod geometrically defined as a cylinder with the same thickness of the anode, but with a radius and length selected to provide the desired duration. This cathode performs the vital function of becoming incandescent in the immediate vicinity of the arc, thus releasing carbon to the plasma.

Figure 4:
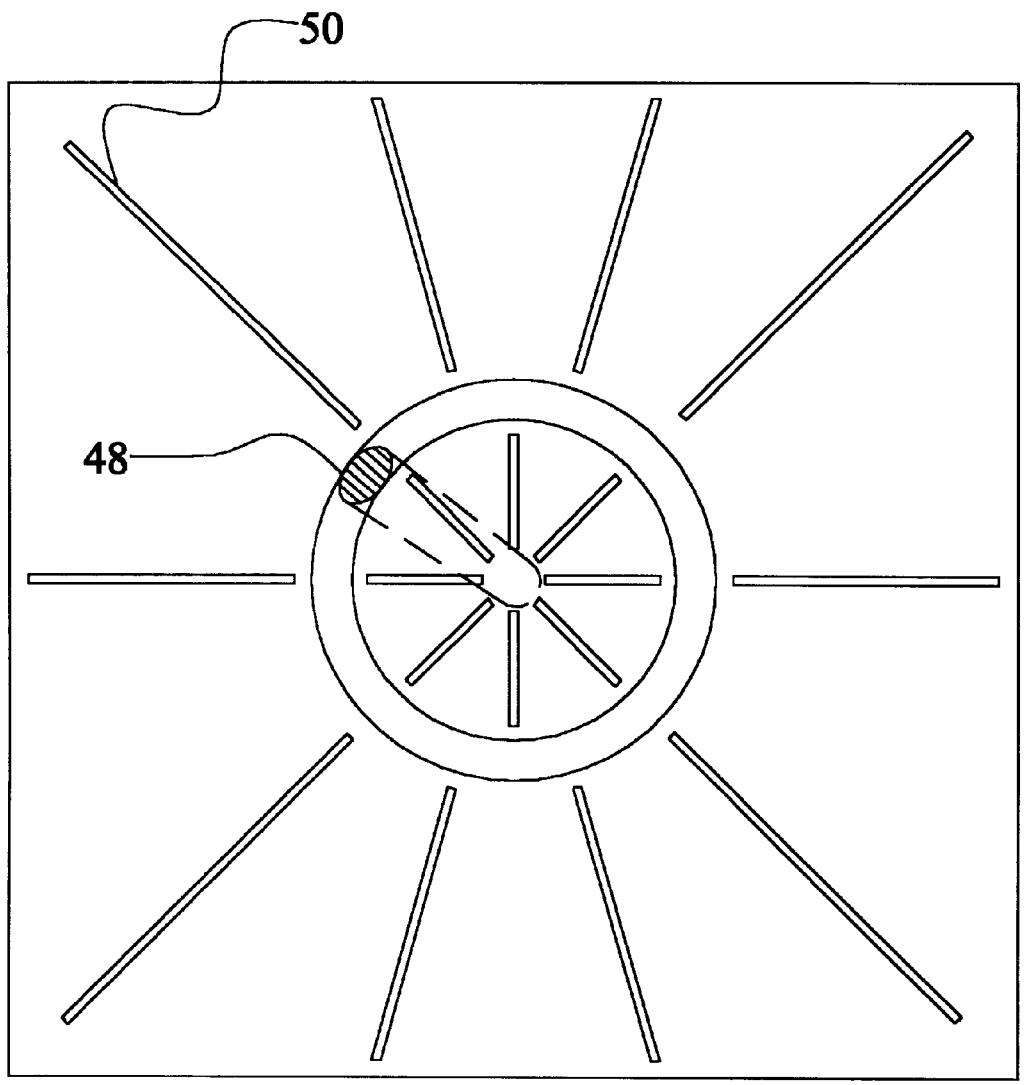
FIG. 4 is a schematic diagram of a partial sectional view taken along line 4—4 of FIG. 3, depicting an additional embodiment of the present invention.

With greater specificity and with reference to FIGS. 3 and 4, the present invention essentially comprises a new and improved system 10 for producing a clean burning combustible gas from an electric arc generating plasma under water. First provided is an electrically conductive anode 12 fabricated of tungsten. The anode is solid in a generally cylindrical configuration with a diameter of about one inch and a length of about three inches.

Next provided is a generally Z-shaped crank 14 of a electrically conductive material. The crank has a linear output end 16 supporting the anode. The crank also has a linear input end 18 essentially parallel with the output end. A transverse connecting portion 20 is located between the input and output ends.

An electrically conductive cathode 22 is next provided. The cathode is fabricated of carbon. The carbon is in a hollow tubular configuration with an axis. The cathode has a supported end 24 and a free end 26. The cathode has a length of about 12 inches and an internal diameter of about 11½ inches and an external diameter of about 12½ inches.

A motor 28 is next provided. The motor has a rotatable drive shaft 30. The drive shaft has a fixed axis of rotation. The motor is coupled to the input end of the crank and is adapted to rotate the crank to move the output end and anode in a circular path of travel. The circular path of travel has a diameter of about twelve inches with the anode located adjacent to the free end of the cathode. In this manner the anode and the arc are continuously moved around the cathode and away from the plasma created by the arc.

Next provided is an axially shifted support 32. The support is in a circular configuration to receive the supported end of the cathode and to move the cathode axially toward the anode as the carbon of the cathode is consumed during operation and use.

A water tight container 34 for the anode, cathode, crank and support is next provided. A quantity of water 36 is provided within the tank sufficient to submerge the anode and the cathode.

An entrance port 38 is provided in the container. The entrance port functions to feed water and a carbon enriched fluid into the container to supplement the carbon and water lost from the container during operation and use.

Next provided is a source of potential 42. The source of potential couples the anode and the cathode. In this manner an electrical arc is created between the anode and the cathode with a surrounding plasma for the production of gas within the water. The gas will then bubble upwardly to above the water.

Lastly provided is an exit port 44 for exhausting gas resulting from the application of current from the source of potential to the anode and the cathode while the anode is rotating and the cathode is shifting axially.

FIG. 4 is a cross-sectional view taken along line 4—4 of FIG. 3, but is directed to an alternate embodiment. In such embodiment, the anode 48 is wing shaped to cause less turbulence in the water when moving. In addition, various supports 50 are provided for abating turbulence and for providing rigidity.

Again with reference to FIG. 3, the anode rod is placed head-on on the edge of the cylindrical cathode and is permitted to rotate around the entire periphery of said cylindrical edge via an electric motor or other means. The inverse case of the rotation of the cathode cylinder on a fixed anode rod or the simultaneous rotation of both, are equally acceptable, although more expensive for engineering and production. Extensive tests have established that, under a sufficient rotational speed of the anode rod on the cylindrical cathode of the order of 100 r.p.m. or thereabout, the consumption of the edge of the cathode tube is uniform, thus permitting the desired continuous underwater arc without the interruptions necessary for the frequent cathode rod replacements in the pre-existing configurations.

For the case of smaller electrical power input the above equipment remains essentially the same, except for the reduction of the diameter of the non-carbon based anode and of the corresponding thickness of the carbon-based cylindrical cathode. For instance, for 14 Kwh power input, said anode diameter and related thickness of the cylindrical cathode can be reduced to about ⅜ inch.

The above new equipment does indeed permit the achievement of the desired duration of the electrodes prior to servicing. As a first illustration for industrial usage, suppose that the manufacturer desires an equipment for the high volume industrial production of said combustible gas from about 100 Kwh energy input with the duration of four hours, thus requiring the servicing twice a day, once for lunch break and the other at the end of the working day, as compared to the servicing only after a few minutes of use for the pre-existing equipment.

This invention readily permits the achievement of said duration under said power input. Recall that carbon rods of about 1ö in diameter are consumed by the underwater arc from 100 Kwh at the speed of about 3 inches in length per minute. Numerous experimentations have established that a cylindrical carbon cathode of 1ö thickness, approximately one foot radius and approximately two feet length permits the achievement of the desired duration of 4 hours of continuous use prior to service. In fact, such a geometry implies that each 1 inch section of the cylindrical cathode is consumed in 6 minutes. Since 4 hours correspond to 240 minutes, the duration of four hours of continuous use requires forty 1 inch sections of the cylindrical cathode. Then, the desired 4 hours duration of said cathode requires the radius R=40/3.14=12.7 inches, as indicated. It is evident that a cylindrical carbon cathode of about two feet in radius and about one foot in length has essentially the same duration as the preceding configuration of one foot radius and two feet length. As a second example for consumer units with smaller power input than the above, the same duration of 4 hours prior to servicing can be reached with proportionately smaller dimensions of said electrodes which can be easily computed via the above calculations.

It is important to show that the same equipment described above also permits the increase of the efficiency as defined earlier. In-depth studies conducted by this inventor at the particle, atomic and molecular levels here, omitted for brevity, have established that the arc is very efficient in decomposing water molecules into hydrogen and oxygen gases. The low efficiency in the production of a combustible gas under the additional presence of carbon as in pre-existing patents is due to the fact that, when said H and O gases are formed in the plasma surrounding the discharge, most of these gases burn, by returning to form again water molecules. In turn, the loss due to re-creation of water molecules is the evident main reason for the low efficiency of pre-existing equipment. The very reason for said poor efficiency is the stationary nature of the arc itself within the plasma, because under these conditions the arc triggers the combustion of hydrogen and oxygen originally created from the separation of the water.

The above described new equipment of this invention also improves the efficiency. In fact, said efficiency can be improved by removing the arc from the plasma immediately after its formation. In turn, an effective way for achieving such an objective without extinguishing the arc itself is to keep the liquid and plasma in stationary conditions, and rapidly move instead the arc away from the plasma. This function is precisely fulfilled by the new equipment of this invention because the arc continuously rotates, by therefore exiting the plasma immediately after its formation. Extensive experimentations conducted have established that the new equipment of this invention can increase the efficiency from the 2–3 cf per Kwh of current embodiments to 4–6 cf per Kwh.

It is easy to see that the same equipment of this invention also decreases the content of carbon dioxide. In fact, $CO_2$ is formed by burning CO and O, thus originating from a secondary chemical reaction in the arc plasma following the creation of CO. But the latter reaction is triggered precisely by the stationary arc within the plasma. Therefore, the removal of the arc from the plasma after its formation via the fast rotation of the anode on the cylindrical edge of the cathode while the liquid is stationary implies a decrease of $CO_2$ content because of the decrease of the ignition of CO and O. Extensive experimentation has established that a rotation of 100 r.p.m of the anode over the edge of the cylindrical cathode of radius one foot decreases the content of carbon dioxide in the combustible gas at least by half, thus permitting a significant environmental advance. The decrease of the $CO_2$ content also implies an increase of the efficiency alternatively defined as energy content of the gas produced per hour (BTUh) divided by the real electric energy absorbed per hour (Kwh). In fact, $CO_2$ is a non-combustible gas, thus having no meaningful BTU content. It is then evident that, since the total carbon content in the gas remains the same, the decrease of the non-combustible $CO_2$ is replaced in the gas by a corresponding increase of the combustible CO with the same carbon content, thus increasing the energy content of the gas for the same production volume of pre-existing inventions and for the same real power absorbed.

With reference to FIG. 3, among various possible alternatives, a preferred embodiment of this invention for the high volume industrial production of a combustible gas from underwater arcs with about 100 Kwh real electrical energy essentially comprises:

A) An enclosed reactor chamber of the approximate dimensions 4 feet high, 3 feet wide and 3 feet long fabricated out of steel sheets or other metal of about ¼ inch thickness, comprising in its interior the electrodes for the creation of the arc serviced by said power input and having means for the exiting of the gas produced in its interior as well as means for the rapid access or servicing 56 of the internal electrodes for services;

B) The filling up of said chamber with a liquid generally consisting of water and/or water saturated with carbon rich water soluble substances;

C) One or more anodes consisting of rods of about 1 inch diameter and about 2 inches length made of Tungsten or other temperature resistant conductor;

D) One or more cylindrical shaped carbon cathodes with essentially the same thickness as that of the anodes and with radius and length selected for the desired duration;

E) Electromechanical means for the rotation of the anode rod head-wise on the edge of the cylindrical cathode, or the rotation of the edge of the cylindrical cathode on a stationary anode rod, or the simultaneous rotation of both;

F) Automation for the initiation of the arc and its maintenance via the automatic advancement of the carbon cathode, and/or the anode rod and/or both, in such a way to maintain constant the arc gap 58.

G) Fastenings of said cylindrical carbon cathode such to permit its rapid replacement; various gauges for the remote monitoring of the power unit, combustible gas, liquid and electrodes; tank for the storage of the gas produced and miscellaneous other items.

An improved version of the above embodiment is conceived to minimize the rotation of said liquid because of drag due to the submerged rotation of the anode, with consequential return to the stationary character of the plasma 54 and the arc, consequential loss of efficiency and increase of $CO_2$ content for the reasons indicated above.

With reference to FIG. 4, and among a variety of embodiments, this objective can be achieved by shaping the rotating anode in the form of a wing with minimal possible drag resistance while rotating within said liquid, and by inserting in the interior of the enclosed reactor chamber panels fabricated out of metal or other strong material with the approximate thickness of ⅛ inch, said panels being placed not in contact with yet close to the cathode and the anode in a radially distributed with respect to the cylindrical symmetry axis of the equipment and placed both inside as well as outside said cylindrical cathode. The latter panels perform the evident function of minimizing the rotational motion of said liquid due to drag created by the submerged rotation of the anode.

The remote operation of the equipment is essentially as follows:

1) The equipment is switched on with electric current automatically set at minimum, the anode rod automatically initiating its rotation on the edge of the cylindrical cathode, and the arc being open;

2) The automation decreases the distance between anode and cathode until the arc is initiated, while the amps are released automatically to the desired value per each given Kwh, and the gap distance is automatically kept to the optimal value of the selected liquid and Kwh via mechanical and/or optical and/or electrical sensors;

3) The above equipment produces the combustible gas under pressure inside the metal vessel, which is then transferred to the storage tank via pressure difference or a pump; production of said combustible gas then continues automatically until the complete consumption of said cylindrical carbon cathode As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. Apparatus for the production of a combustible and non-polluting gas from submerged arcs between electrodes comprising:

an electrical DC power supply suitable to generate an underwater arc between electrodes;

an enclosed pressure resistant reactor chamber, the chamber having means for the exiting of a produced combustible gas, the chamber further having means for the rapid servicing of the electrodes, the electrodes being inside said chamber;

a liquid filling up said reactor chamber at least to submerge said electrodes; and the electrodes including a rod-shaped anode made from an extended life temperature resistant conductor, means for rotating said anode head-wise on an edge of a cylindrical-shaped carbon cathode having essentially the same thickness as the anode, the cathode having a predetermined radius and length corresponding to a desired operational duration, the cathode further having means for providing a forward and backward motion for maintaining a gap distance between the anode and cathode after initiation of the generated arc, wherein the generated arc across the electrodes submerged in the liquid produces a combustible and non-pollutant gas.

2. The apparatus according to claim 1, wherein the DC power supply further includes means for automation for the initiation of the generated arc between said anode and cathode, the DC power supply also being in electrical communication with the means for providing the forward and backward motion of the cathode.

3. The apparatus according to claim 1, wherein said rod-shaped anode is wing shaped for minimizing a resistance while rotating within said liquid, said reactor chamber additionally having radially oriented panels for reducing a rotation of said liquid caused by the submerged rotation of the anode.

4. The apparatus according to claim 1 further comprising a water soluble carbon rich substance added to the liquid.

5. A new and improved system for producing a clean burning combustible gas from an electric arc generating plasma under water comprising, in combination:
   an electrically conductive anode fabricated of tungsten, the anode being solid in a generally cylindrical configuration;
   a generally Z-shaped crank of an electrically conductive material having a linear output end supporting the anode and a linear input end essentially parallel with the output end and with a transverse connecting portion therebetween;
   an electrically conductive cathode fabricated of carbon, the carbon cathode being in a hollow tubular configuration with an axis, said cathode having a supported end and a free end;
   a motor with a rotatable drive shaft having a fixed axis of rotation aligned with the axis of the cathode and coupled to the input end of the Z-shaped crank and adapted to rotate the Z-shaped crank to move the output end and anode in a circular path of travel with the anode located adjacent to the free end of the cathode to continuously move the anode around the cathode such that an arc is moving away from a plasma created by the arc to form additional plasmas around a periphery of the cathode;
   an axially shifted support in a circular configuration to receive the supported end of the cathode and to move the cathode axially toward the anode as the carbon of the cathode is consumed during operation and use;
   a pressure tight tank within which is disposed the anode, cathode, crank and support with a quantity of water within the tank sufficient to submerge the anode and the cathode;
   an entrance port in the tank to feed the quantity of water and a carbon enriched fluid into the tank to supplement the carbon and water lost from the tank during operation and use;
   a source of potential coupling the anode and the cathode for the creation of an electrical arc therebetween with a surrounding plasma for the production of gas within the water and bubbling upwardly to above the water; and
   an exit port for exhausting gas resulting from the application of current from the source of potential to the anode and the cathode while the anode is rotating and the cathode is shifting axially.

6. A system for producing a clean burning combustible gas comprising:
   an electrically conductive first electrode;
   a generally Z-shaped crank of an electrically conductive material supporting the first electrode;
   an electrically conductive second electrode;
   a motor coupled to the first electrode and supporting z-shaped crank and adapted to move the first electrode with respect to the second electrode to continuously move an arc generated between the first and second electrodes away from a plasma created by the arc; and
   a water tight tank within which is disposed the electrodes with a quantity of water within the tank sufficient to submerge the electrodes.

7. The system as set forth in claim 5 wherein the cathode is fabricated of graphite in the form of an enlarged hollow cylinder.

8. The system as set forth in claim 6 wherein the first electrode is an anode made from a non-consumable electrically conductive material.

9. The system as set forth in claim 8, wherein the non-consumable electrically conductive material is one of tungsten, tungsten alloy, ceramic, and combinations thereof.

10. A method for producing a clean burning combustible gas comprising the steps of:
    providing an electrically conductive first electrode;
    providing a generally Z-shaped crank of an electrically conductive material supporting the first electrode;
    providing an electrically conductive second electrode of an essentially non-combustible material in a solid cylindrical configuration;
    disposing the electrodes in a pressure tight tank filled with a quantity of liquid within the tank sufficient to submerge the electrodes, the electrodes for generating an arc to produce a combustible gas when electrical current is applied to the electrodes; and
    moving the first electrode with respect to the second electrode to continuously move the arc away from a plasma created by the arc.

11. The method for producing a clean burning combustible gas according to claim 8, wherein the non-combustible material from which the second electrode is made is tungsten.

* * * * *